US008079800B2

(12) United States Patent
Tanaka et al.

(10) Patent No.: US 8,079,800 B2
(45) Date of Patent: Dec. 20, 2011

(54) ARTICULATED ROBOT

(75) Inventors: Tsutomu Tanaka, Tokyo (JP); Masanao Suzuki, Tokyo (JP); Hironobu Suna, Takaoka (JP)

(73) Assignees: Honda Motor Co., Ltd., Tokyo (JP); Oyabe-Seiki Co., Ltd., Toyama (JP)

( * ) Notice: Subject to any disclaimer, the term of this patent is extended or adjusted under 35 U.S.C. 154(b) by 213 days.

(21) Appl. No.: 12/072,838

(22) Filed: Feb. 28, 2008

(65) Prior Publication Data

US 2008/0213077 A1 Sep. 4, 2008

(30) Foreign Application Priority Data

Mar. 1, 2007 (JP) ................................ 2007-051305

(51) Int. Cl.
*B25J 17/00* (2006.01)

(52) U.S. Cl. ..................... 414/744.5; 74/490.05; 901/28

(58) Field of Classification Search ............... 414/744.3, 414/744.5, 719, 917; 901/15, 28; 74/490.01, 74/490.05; 100/207
See application file for complete search history.

(56) References Cited

U.S. PATENT DOCUMENTS

| | | | | |
|---|---|---|---|---|
| 4,712,969 A | 12/1987 | Kimura | | |
| 4,972,574 A | 11/1990 | Isono et al. | | |
| 5,484,051 A | 1/1996 | Nagai et al. | | |
| 6,085,670 A | 7/2000 | Genov | | |
| 6,199,444 B1 | 3/2001 | Wakaizumi et al. | | |
| 6,202,004 B1 * | 3/2001 | Valerino, Sr. | ................. | 700/218 |
| 7,175,381 B2 * | 2/2007 | Guerra | ....................... | 414/744.5 |
| 2008/0028883 A1 | 2/2008 | Inada et al. | | |

FOREIGN PATENT DOCUMENTS

| | | | |
|---|---|---|---|
| CN | 1092145 | A | 9/1994 |
| CN | 1256988 | A | 6/2000 |
| JP | 60-104677 | A | 6/1985 |
| JP | 60-161572 | A | 10/1985 |
| JP | 60-208664 | A | 10/1985 |
| JP | 61-203281 | A | 9/1986 |
| JP | 61-244474 | A | 10/1986 |
| JP | 62-107875 | U | 5/1987 |
| JP | 63-080934 | | 4/1988 |
| JP | 2-124286 | A | 5/1990 |
| JP | 04-009611 | | 2/1992 |
| JP | 06-047465 | | 2/1994 |
| JP | 06-042089 | U | 6/1994 |
| JP | 06-263244 | A | 9/1994 |
| JP | 07-116973 | A | 5/1995 |

(Continued)

*Primary Examiner* — Donald Underwood

(74) *Attorney, Agent, or Firm* — Carrier Blackman & Associates, P.C.; Joseph P. Carrier; William D. Blackman

(57) ABSTRACT

An articulated robot includes a first arm which is horizontally angularly movable, a sectorial support plate coaxial with a center about which the first arm is angularly movable, an auxiliary arm parallel to the first arm, and a joint member connected to respective distal ends of the first arm and the auxiliary arm. An arcuate rail is mounted on the support plate. The first arm, the auxiliary arm, and the joint member make up a parallel link mechanism. The arcuate rail engages an engaging assembly mounted on an upper surface of the first arm. A second arm is angularly movably connected to the joint member, and a third arm is angularly movably connected to the distal end of the second arm. An end effector for attracting a workpiece is connected to the distal end of the third arm.

20 Claims, 12 Drawing Sheets

FOREIGN PATENT DOCUMENTS

| | | | |
|---|---|---|---|
| JP | 07-241787 | A | 9/1995 |
| JP | 07-299774 | | 11/1995 |
| JP | 07-308876 | | 11/1995 |
| JP | 2726977 | | 12/1997 |
| JP | 2785597 | | 5/1998 |
| JP | 10-315178 | A | 12/1998 |
| JP | 2000-042953 | A | 2/2000 |
| JP | 2000-077499 | A | 3/2000 |
| JP | 2002-512900 | A | 5/2002 |
| JP | 2002-164402 | A | 6/2002 |
| JP | 2005-277129 | A | 10/2005 |
| JP | 2006-123009 | | 5/2006 |
| WO | 2006/009170 | A1 | 1/2006 |

* cited by examiner

ARTICULATED ROBOT

BACKGROUND OF THE INVENTION

1. Field of the Invention

The present invention relates to an articulated robot having a plurality of arms connected by angularly movable joints, and more particularly to an articulated robot movable in a wide horizontal range.

2. Description of the Related Art

It is often customary in vehicle manufacturing factories for workpieces to be progressively machined while being conveyed between a plurality of stations or machining units. The workpieces should desirably be conveyed quickly for increased productivity.

Proposed means for conveying workpieces include a reciprocatingly movable carriage for conveying workpieces between machining units, and a loader and an unloader for transferring workpieces between the carriage and the machining units (see, for example, Japanese Patent Publication No. 04-009611). The proposed means are capable of moving workpieces over a long distance.

Processes for conveying workpieces with articulated robots have also been proposed in the art (see, for example, Japanese Patent No. 2785597, Japanese Laid-Open Patent Publication No. 2006-123009, Japanese Patent No. 2726977, and Japanese Laid-Open Patent Publication No. 07-308876). The proposed processes for conveying workpieces with articulated robots are relatively simple because workpieces can be unloaded, conveyed, and loaded by a single articulated robot.

Using a carriage, a loader, and an unloader to convey a workpiece, as disclosed Japanese Patent Publication No. 04-009611, fails to convey the workpiece quickly because it is necessary to transfer the workpiece from the loader to the carriage and also from the carriage to the unloader. As it is also necessary to synchronize the workpiece transfer cycles, the overall control process is complex to perform. Furthermore, the carriage moves along paths provided by conveying frames which are fixedly installed depending on the distances between the machining units. Therefore, the conveying frames that have been fixedly installed once will not be applicable in the case where the layout of the machining units is to be changed.

In addition, since the three apparatus, i.e., the carriage, the loader, and the unloader, are required, they need a large installation space, and the cost of installing them is high.

The articulated robot disclosed in Japanese Patent No. 2785597 lacks a horizontally moving mechanism. When the articulated robot conveys the workpiece horizontally, the arm takes an elbow-up attitude and thus needs a wide vertical space for its movement.

The articulated robots disclosed in Japanese Laid-Open Patent Publication No. 2006-123009, Japanese Patent No. 2726977, and Japanese Laid-Open Patent Publication No. 07-308876 have horizontally angularly movable joints. However, since the disclosed articulated robots also have vertically angularly movable joints, the workpiece carried thereby and the arm move unnecessarily vertically, as with the articulated robot disclosed in Japanese Patent No. 2785597.

If the distances to convey workpieces between the machining units are long, then the arm of the articulated robot needs to be considerably long. However, the long arm tends to flex unduly due to its own weight and the weight of the workpiece carried thereby, resulting in a reduction in the accuracy with which the arm conveys the workpiece.

SUMMARY OF THE INVENTION

It is an object of the present invention to provide an articulated robot which is capable of moving a workpiece over a long distance, is less liable to flex under its own weight and the weight of the workpiece carried thereby, and is capable of conveying the workpiece with high accuracy.

According to the present invention, an articulated robot comprises a plurality of arms connected by angularly movable joints, the arms including a horizontal arm angularly movable horizontally about a point thereof, and a support member having an arcuate shape coaxial with the point of the horizontal arm, supporting slidably a portion of the horizontal arm on the support member.

As the arcuate support member supports the horizontal arm, the arms are less liable to flex due to their own weight and the weight of a workpiece carried thereby. Even if the overall length of the arms is long, the articulated robot can convey the workpiece accurately over a long distance.

The support member may comprise a rail engaging the portion of the horizontal arm. The rail reliably supports the horizontal arm and guides the horizontal arm for smooth angular movement therealong.

The portion of the horizontal arm may be supported by the support member at a position between a distal end thereof and the center of the horizontal arm to further reduce any flexure of the arms reliably.

If the portion of the horizontal arm is slidably supported on the support member for angular movement through an angular range from 90° to 180°, then the articulated robot has a considerably wide operation range.

If the articulated robot further comprises a lifting and lowering device for vertically moving the support member, then the articulated robot can easily transfer the workpiece to and from machining units and can easily move the workpiece while avoiding obstacles. The arms do not move vertically in a so-called elbow-up attitude, and hence a space around the arms can effectively be utilized.

If the lifting and lowering device has a weight compensating means for compensating weights of the horizontal arm and the support member, then the power required to lift and lower the arms and the support member is reduced.

The lifting and lowering device may include two parallel lifting and lowering devices for tilting the support member by changing respective distances by which the lifting and lowering devices vertically move the support member.

The arms may include a foremost arm which is horizontally angularly movable and/or torsionally movable, and the arms other than the foremost arm may be horizontally angularly movable. With this structure, since the central axes of the arms are not vertically displaced, hence a space around the arms can effectively be utilized. The foremost arm which is torsionally movable can hold the workpiece depending on the shape and tilt of the workpiece.

The arms may include a foremost arm having a vacuum means for attracting a workpiece. The vacuum means can easily attract and hold the workpiece.

The arms may include a foremost arm, and the foremost arm may include a circulatory member extending longitudinally therein for angularly moving an end effector mounted on a distal end of the foremost arm. The circulatory member allows an actuator to be disposed on the proximal end of the foremost arm, so that any inertial moment on the foremost arm is small enough to allow the foremost arm to operate stably. Also, the moment is small enough to prevent the arm from bending. The circulatory member is not limited to a member for making a circulating motion, but may be a member which is reciprocatingly movable by the actuator.

The arms may include an auxiliary arm extending parallel to the horizontal arm, and a joint member connected to respective distal ends of the horizontal arm and the auxiliary arm, the horizontal arm, the auxiliary arm, and the joint member jointly making up a parallel link mechanism. The parallel link mechanism is effective to further reduce any flexure of the arms due to their own weight and the weight of the workpiece.

The articulated robot may further comprise rotary drive sources mounted respectively on the horizontal arm and the auxiliary arm for angularly moving the parallel link mechanism. The rotary drive source per arm is relatively small in size, and the layout of the rotary drive sources can be designed with great freedom.

The joint member may be connected to the respective distal ends of the horizontal arm and the auxiliary arm by respective pivot shafts thereof, and the arms may further include a second arm connected to the joint member on a side of the distal ends with respect to the pivot shafts. Thus, an actuator for actuating the second arm can be placed according to a free layout without being affected by the pivot shaft of the horizontal arm and the pivot shaft of the auxiliary arm.

The second arm may be connected to the joint member on a line extending through one of the pivot shafts perpendicularly to a line interconnecting the pivot shaft of the horizontal arm and the pivot shaft of the auxiliary arm. Thus, any flexure of the second arm under its own weight and the overall weight of the workpiece is reduced due to the width of the parallel link mechanism.

The arms include an arm connected ahead of the horizontal arm, and the arm may have an angularly immovable range in a direction in which a proximal arm connected to a proximal end of the arm extends and have an angularly movable range in the opposite direction of the direction. With this arrangement, the arms can be folded for conveying the workpiece in a small space.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An articulated robot according to an embodiment of the present invention will be described in detail below with reference to FIGS. 1 through 12. In the description which follows, a dynamic rotational force produced by rotational movement will be referred to as "inertial moment", and a static rotational force produced downwardly by gravity or the like will be referred to as "static moment" or simply "moment", so that these forces will be distinguished from each other.

Figure 1:
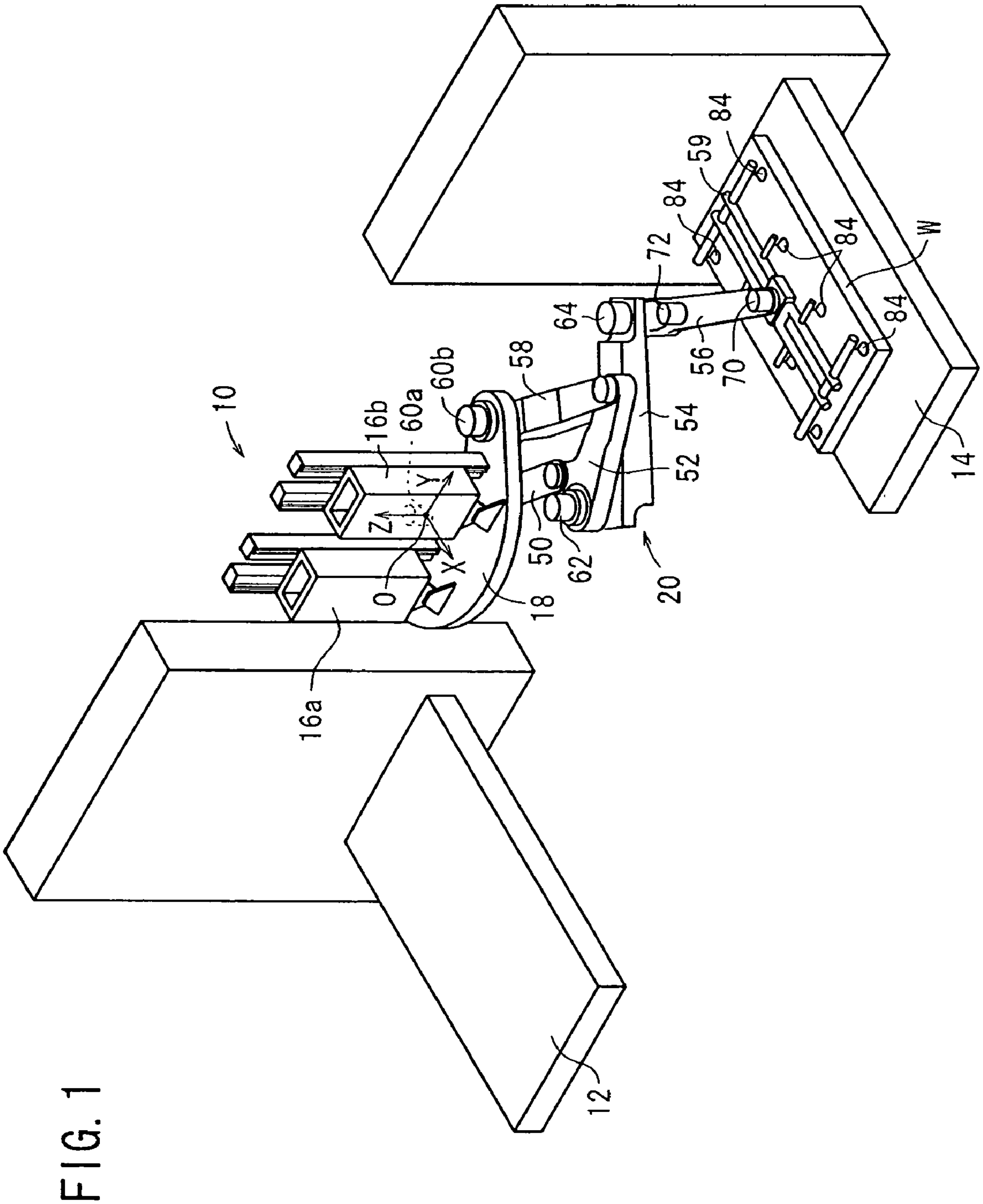
FIG. 1 is a perspective view of an articulated robot according to an embodiment of the present invention.

As shown in FIG. 1, the articulated robot, generally denoted by 10, according to the embodiment of the present invention serves to unload a workpiece W from a machining unit 12 and load the workpiece W into another machining unit 14.

The articulated robot 10 comprises a pair of parallel lifting and lowering devices 16*a*, 16*b*, a support plate (support member) 18 which can be lifted and lowered by the lifting and lowering devices 16*a*, 16*b*, an arm assembly 20 connected to the support plate 18, and an end effector 59 mounted on the distal end of the arm assembly 20. The articulated robot 10 operates under the control of a controller, not shown, to control the distance by which the lifting and lowering devices 16*a*, 16*b* lift and lower the support plate 18 and the attitude of the arm assembly 20 to convey the workpiece W.

The support plate 18 has a center O, forward and rearward directions represented by X directions, lateral directions by Y directions, and vertical directions by Z directions. Distances and positions along the X directions are represented by X coordinates.

Figure 2:
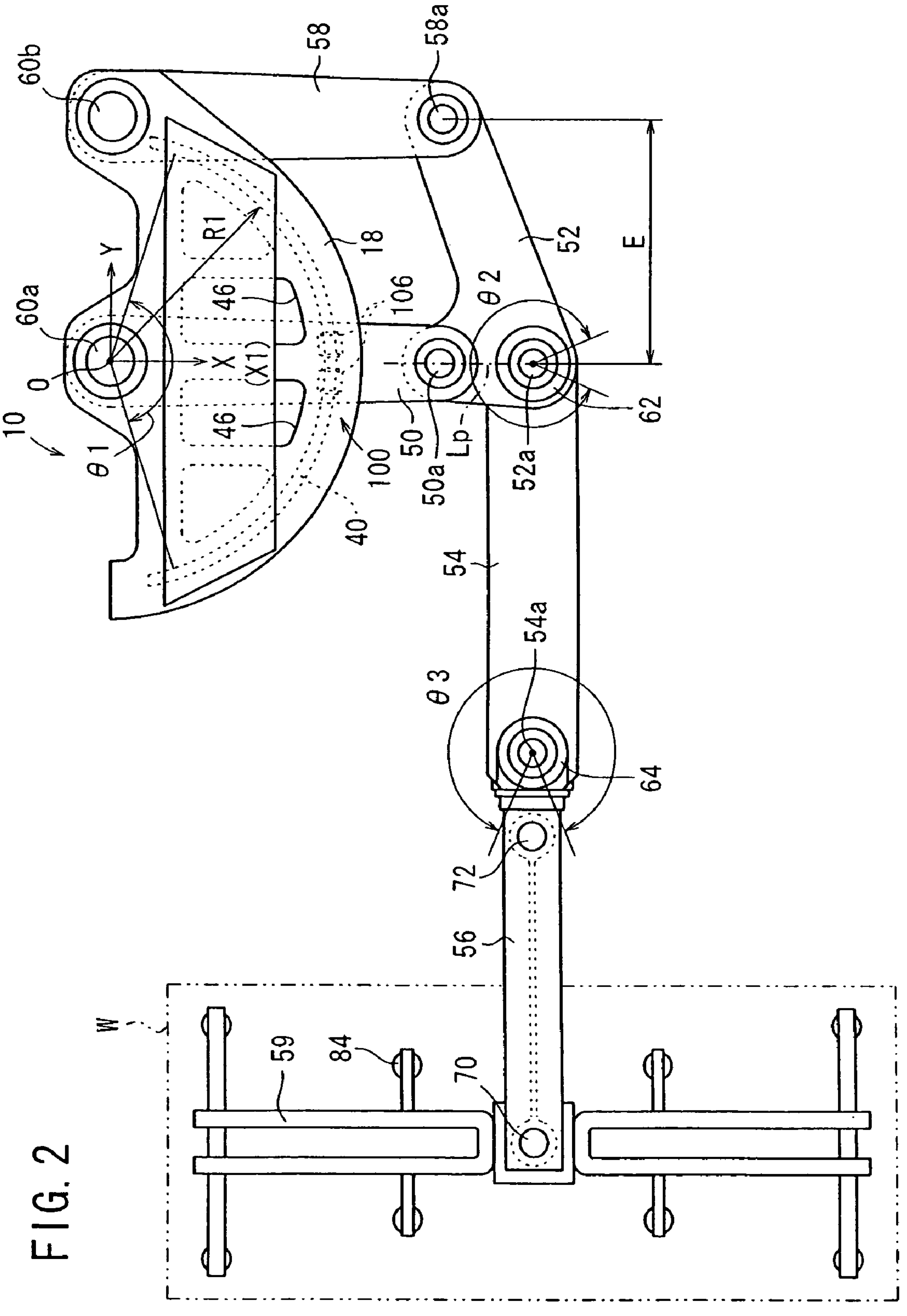
FIG. 2 is a plan view of the articulated robot according to the embodiment of the present invention.
Figure 3:
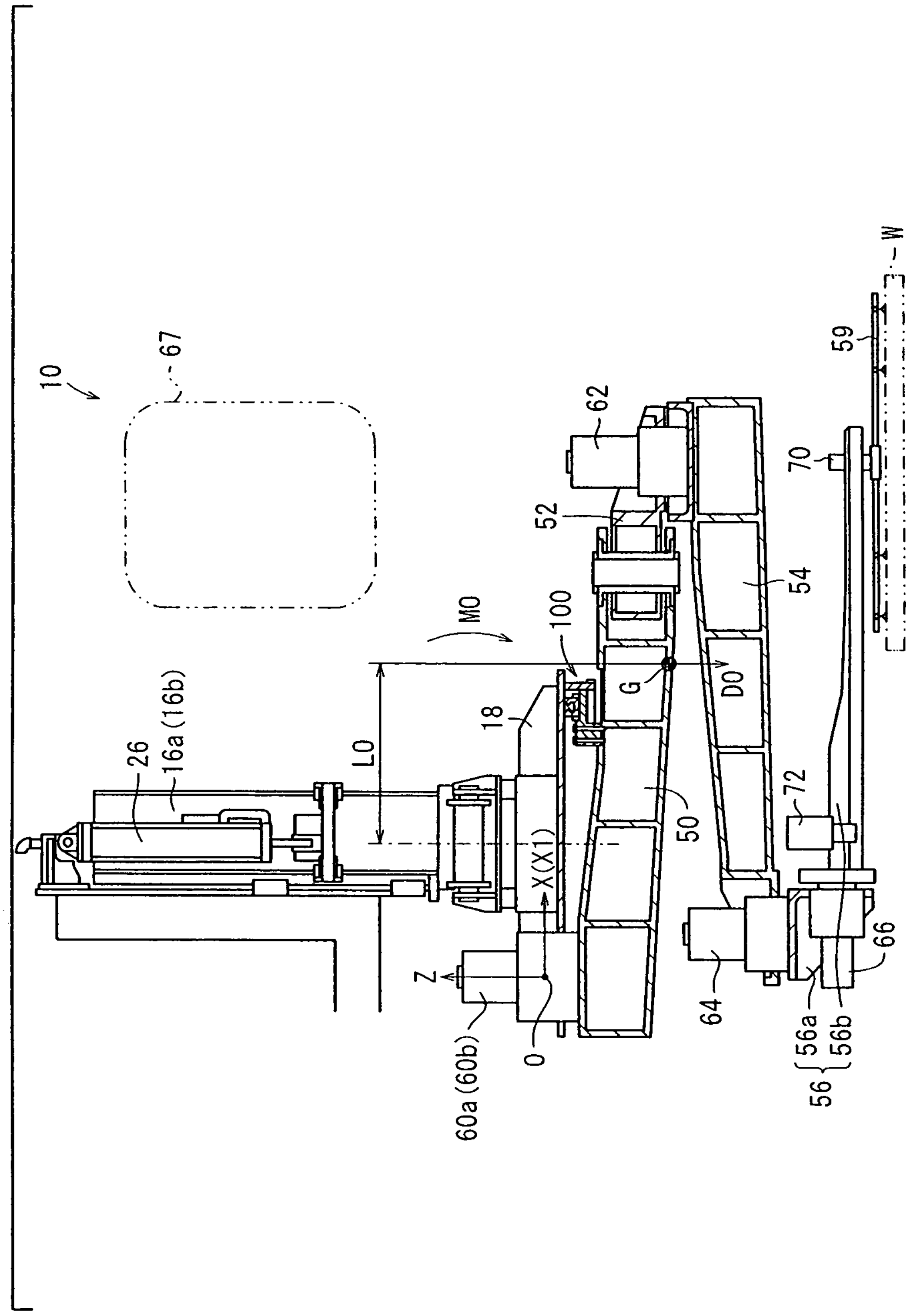
FIG. 3 is a sectional side elevational view of the articulated robot according to the embodiment of the present invention.
Figure 4:
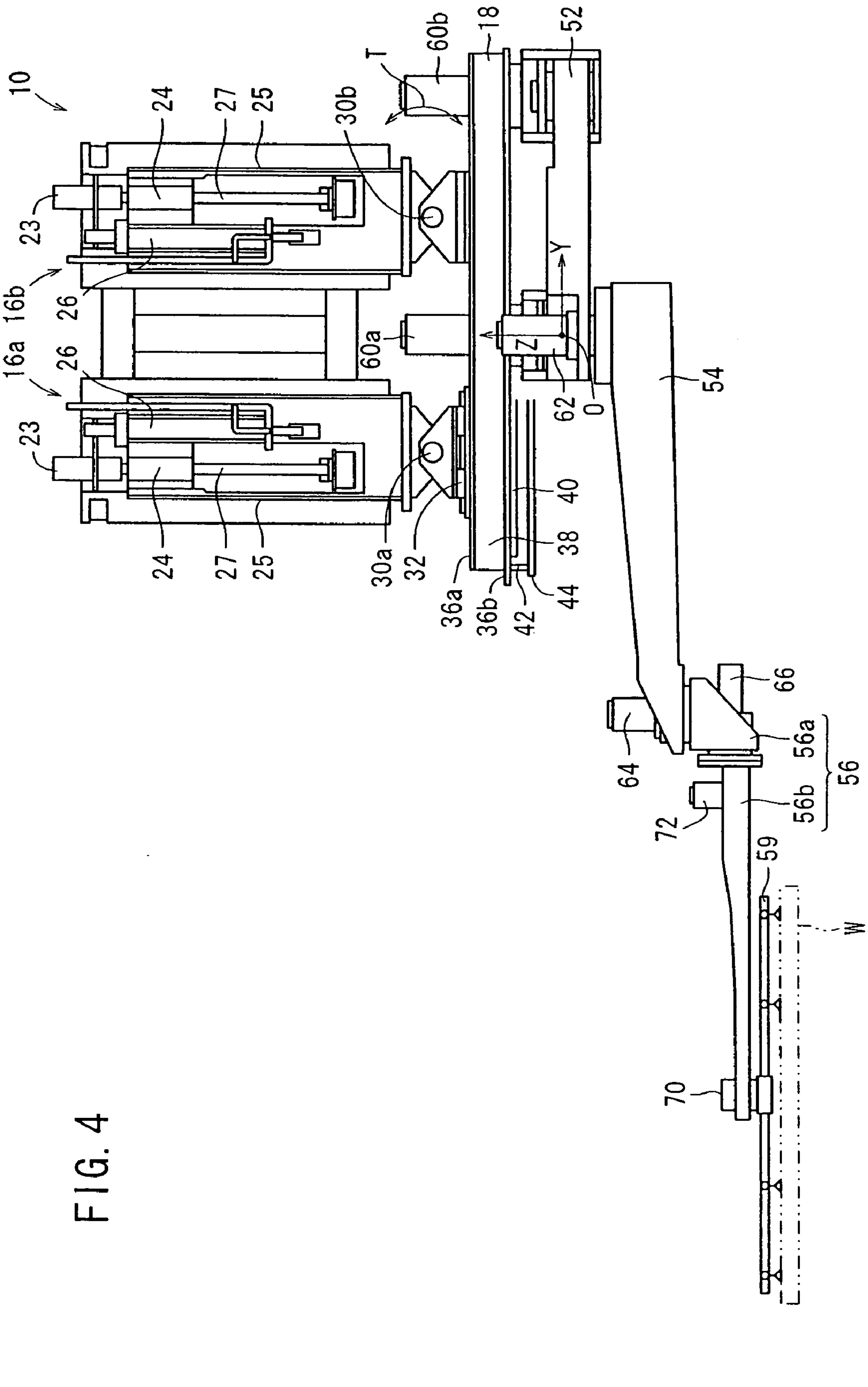
FIG. 4 is a front elevational view of the articulated robot according to the embodiment of the present invention.

As shown in FIGS. 2 through 4, the lifting and lowering device 16*a* comprises a lifting and lowering motor 23, a ball screw 27 rotatable about its own axis by the lifting and lowering motor 23, a nut 24 threaded over the ball screw 27 for vertical movement upon rotation of the ball screw 27, a guide rail 25 for vertically guiding the nut 24, and a cylinder (weight compensating means) 26 for urging the nut 24 to move upwardly. The cylinder 26 is arranged to generate a force for compensating for one-half of the weights of the arm assembly 20 and the support plate 18.

The lifting and lowering device 16*b* is identical in structure to the lifting and lowering device 16*a*. Since the lifting and lowering device 16*b* also has a cylinder 26, the lifting and lowering devices 16*a*, 16*b* jointly compensate for all the weights of the arm assembly 20 and the support plate 18. Accordingly, the power required to lift and lower the arm assembly 20 and the support plate 18 is reduced.

The lifting and lowering device 16*a* is connected to the support plate 18 by a pivot shaft 30*a* on the lower end of the lifting and lowering device 16*a* and a horizontal slide rail 32 on the support plate 18. The lifting and lowering device 16*b* is connected to the support plate 18 by a pivot shaft 30*b* on the lower end of the lifting and lowering device 16*b*. When the lifting and lowering devices 16*a*, 16*b* lift and lower the support plate 18 by different distances, respectively, the lower end of the lifting and lowering device 16*a* moves horizontally along the horizontal slide rail 32, causing the support plate 18 and the arm assembly 20 to be tilted about the pivot shaft 30*b* as indicated by the arrow T (see FIG. 4).

The support plate 18 as it is viewed in plan is of a sectorial shape of about 180° (see FIG. 2). As shown in FIG. 4, the support plate 18 comprises two parallel upper and lower panels 36*a*, 36*b*, a plurality of reinforcing members 38 interconnecting the upper and lower panels 36*a*, 36*b*, an arcuate rail 40 mounted on the lower surface of the lower panel 36*b*, and an oil pan 44 fixed to the lower surface of the lower panel 36*b* by posts 42 attached to the opposite ends of thereof. The upper and lower panels 36*a*, 36*b* have a plurality of holes 46 defined therein for reducing their weights.

The oil pan 44 comprises an arcuate plate having an upwardly open concave cross-sectional shape. The oil pan 44 serves to prevent a grease or the like from dropping off an engaging assembly 100 to be described later.

The arcuate rail 40 supports the engaging assembly 100 (see FIG. 6) of a first arm 50 to be described later, and is mounted on the support plate 18 near an arcuate circumferential edge thereof. The arcuate rail 40 should desirably have a wide angle to give the first arm 50 a wide operation angle. For example, the angle of the arcuate rail 40 may be set to 90° or greater, about the center O.

In view of moving the workpiece W in the lateral directions (Y directions), it is normally sufficient for the arcuate rail 40 to have an angle of up to 180°. With the articulated robot 10, the arcuate rail 40 and the oil pan 44 are set to an angle of about 180° about the center O.

The arcuate rail 40 extending about the center O has a radius R1 (see FIG. 10A) which is slightly smaller than the inter-axis length R2 (see FIGS. 7 and 10A) of the first arm 50. Preferably, the radius R1 is at least one-half of the length R2, so that the arcuate rail 40 supports the first arm 50 at a position between the distal end and the middle point of the first arm 50, and is as close to the length R2 as possible.

As shown in FIG. 3, the lifting and lowering devices 16*a*, 16*b* support the support plate 18 at a position forward of the center O in the direction indicated by the arrow X1, as viewed in side view. The arm assembly 20 has a center G of gravity positioned forwardly of the center O. The center G of gravity is horizontally spaced from the position at which the lifting and lowering devices 16*a*, 16*b* support the support plate 18, by a considerably small distance L0. Accordingly, the mass D0 of the arm assembly 20 produces a small moment M0 (=L0×D0), thereby preventing excessive forces from being applied to the lifting and lowering devices 16*a*, 16*b*. When the articulated robot 10 conveys the workpiece W, it does not move the workpiece W excessively forwardly, but keeps its X coordinate small. Therefore, the X coordinate of the center G of gravity is kept small, also preventing excessive forces from being applied to the lifting and lowering devices 16*a*, 16*b*.

The arm assembly 20 is an articulated robot of arms connected by angularly movable joints. Specifically, the arm assembly 20 comprises the first arm (horizontal arm) 50, a joint member 52, a second arm 54, and a third arm 56, in the order named from the proximal end toward the distal end. The arm assembly 20 includes an auxiliary arm 58 extending parallel to the first arm 50. The first arm 50 and the auxiliary arm 58 have respective distal ends angularly movably connected to the joint member 52.

As shown in FIG. 2, the first arm 50 is mechanically angularly movable through an angular range θ1 of 170° across the direction indicated by the arrow X1. The second arm 54 is mechanically angularly movable through an angular range θ2 of 350° across the direction extending from a pivot shaft 52*a* by which the joint member 52 and the second arm 54 are angularly movably connected to each other toward a pivot shaft 50*a* by which the distal end of the first arm 50 is angularly movably connected to the joint member 52. The third arm 56 is mechanically angularly movable through an angular range θ3 of 350° across the direction extending from a pivot shaft 54*a* by which the distal end of the third arm 56 is angularly movably connected to the second arm 54 toward the pivot shaft 52*a*.

The angular range of an angularly movable shaft is mechanically difficult to set to 360° or more, and the angularly movable shaft has a certain angularly immovable range. On general articulated robots, the angularly immovable ranges for arms are set toward the proximal end of the arm assembly to allow the arms to extend toward the distal end of the arm assembly for giving the arm assembly a wider angularly movable range.

With the articulated robot 10, the second arm 54 and the third arm 56, which are connected ahead of the first arm 50, have their respective angularly immovable ranges in their respective directions which their respective arms connected to the proximal ends of the second and third arms extend, with their angularly movable ranges set in the opposite directions. In other words, unlike the general articulated robots, the second arm 54 and the third arm 56 have their respective angularly immovable ranges set toward the distal end of the arm connected to the proximal end thereof and their respective angularly movable ranges set toward the proximal end of the thus-connected arm.

Figure 8:
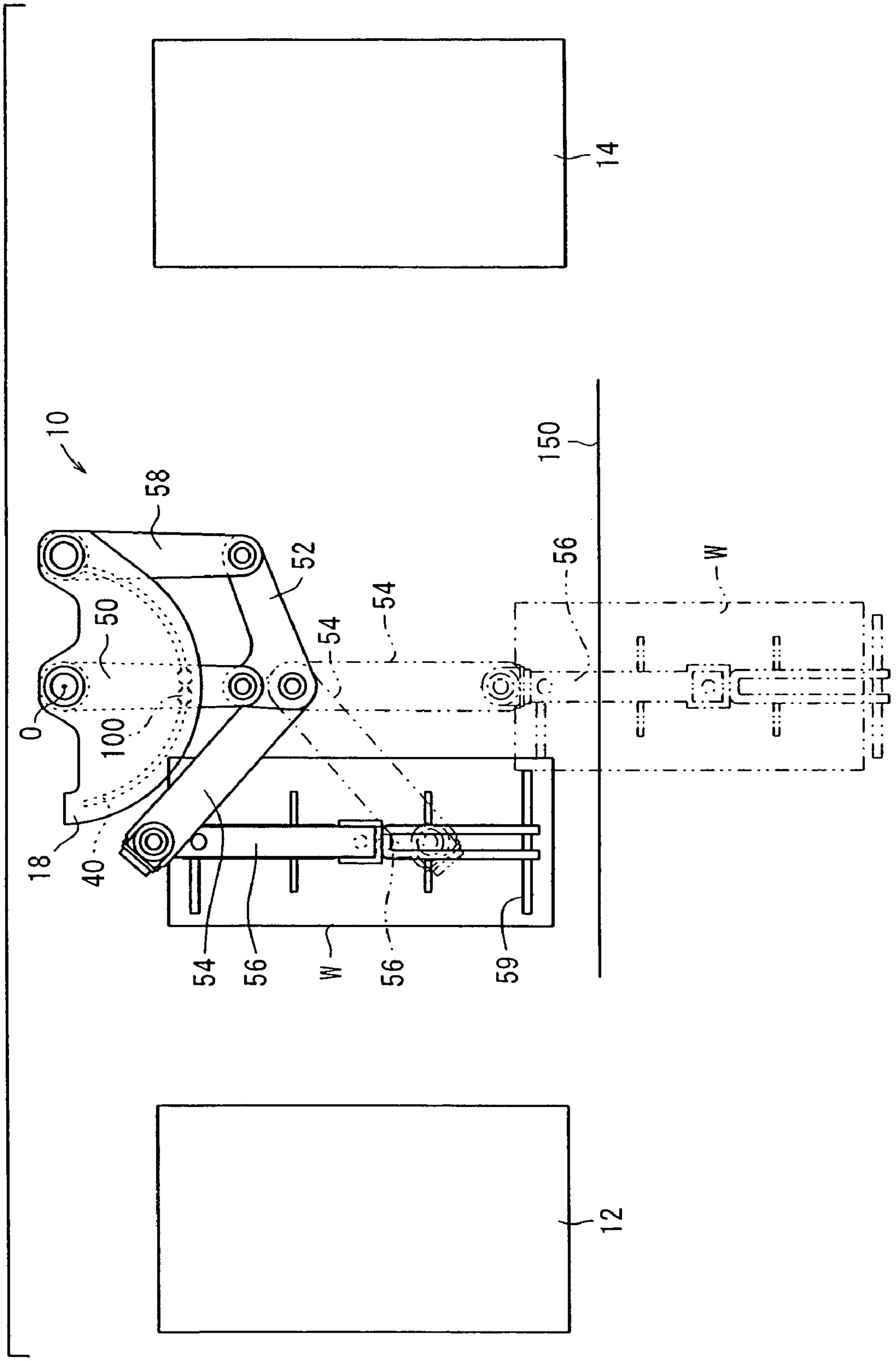
FIG. 8 is a plan view of the articulated robot while it is conveying the workpiece from the machining unit to another machining unit.

The angularly movable and immovable ranges thus established for the articulated robot 10 allow the arms to be folded together as shown in FIG. 8 for conveying the workpiece W in a small space.

For illustrative purposes, however, the second arm 54 and the third arm 56 are illustrated or modeled as being able to extend toward the distal end of the arm assembly.

The first arm 50, the joint member 52, the second arm 54, the third arm 56, and the auxiliary arm 58 may be made of aluminum (including aluminum alloy), stainless steel, steel, or the like. The first arm 50, the joint member 52, the second arm 54, the third arm 56, and the auxiliary arm 58 may be of a box structure or a block structure, and may be cast or formed to shape.

The first arm 50 and the auxiliary arm 58 are identical in shape to each other and have the same inter-axis length R2. The first arm 50, the auxiliary arm 58, and the joint member 52 jointly make up a parallel link mechanism. The end effector 59 for attracting the workpiece W is mounted on the distal end of the third arm 56.

The first arm 50 has its proximal end pivotally supported on the support plate 18 at the center O, and is angularly actuatable by a motor (rotary drive source) 60*a*. The auxiliary arm 58 has its proximal end pivotally supported on the support plate 18 at the right end (as viewed in plan in FIG. 2) thereof, and is angularly actuatable by a motor (rotary drive source) 60*b*. Since the parallel link mechanism is actuated by the two motors 60*a*, 60*b*, each of the motors 60*a*, 60*b* may be smaller in size and their layout may be designed with greater freedom. The motors 60*a*, 60*b* and other motors to be described later may be associated with respective speed reducers such as gears.

The first arm 50 and the auxiliary arm 58 are disposed beneath the support plate 18, and the motors 60*a*, 60*b* are mounted on and project upwardly from the support plate 18.

The joint member 52 is substantially L-shaped and includes a shorter portion having a distal end angularly movably connected to the distal end of the first arm 50 by the pivot shaft 50*a* and a longer portion having a distal end angularly movably connected to the distal end of the auxiliary arm 58 by a pivot shaft 58*a*.

The second arm 54 has its proximal end angularly movably supported on the intermediate corner of the L-shaped joint member 52 by pivot shaft 52*a*, and is angularly actuatable by a motor (rotary drive source) 62. The second arm 54 is disposed beneath the joint member 52, and the motor 62 is mounted on and projects upwardly from the joint member 52.

The second arm 54 is thus connected to the joint member 52 on a side of the distal end of the arm assembly 20 with respect to the pivot shaft 50*a* of the first arm 50 and the pivot shaft 58*a* of the auxiliary arm 58. Therefore, the motor 62 for actuating the second arm 54 can be placed according to a free layout without being affected by the pivot shaft 50*a* of the first arm 50 and the pivot shaft 58*a* of the auxiliary arm 58. The motor 62 which projects upwardly from the joint member 52 is kept out of physical interference with the third arm 56.

The second arm 54 is connected to the joint member 52 on a line Lp extending through the pivot shaft 50*a* along the shorter portion of the L-shaped joint member 52 perpendicularly to a line interconnecting the pivot shaft 50*a* of the first arm 50 and the pivot shaft 58*a* of the auxiliary arm 58. Any flexure of the second arm 54 under its own weight and the overall weight H of the workpiece W (see FIG. 10A) is reduced due to the width E of the parallel link mechanism.

Each of the first arm 50, the second arm 54, and the joint member 52 is of a box structure having reinforcing webs disposed therein. Therefore, the first arm 50, the second arm 54, and the joint member 52 are lightweight and highly strong.

As shown in FIGS. 3 and 4, the third arm 56 comprises a short proximal end member 56*a* and an extension member 56*b* extending horizontally from the proximal end member 56*a*. The proximal end member 56*a* is angularly movably supported on the distal end of the second arm 54 and is angularly actuatable by a motor (rotary drive source) 64. The proximal end member 56*a* is disposed beneath the second arm 54, and the motor 64 is mounted on and projects upwardly from the second arm 54.

Since the motor 64 actuates the third arm 56 and the end effector 59 which is lightweight, the motor 64 may be small in size and is kept out of physical interference with the lower surfaces of the first arm 50, the auxiliary arm 58, and the joint member 52.

The extension member 56*b* is angularly movably mounted on the proximal end member 56*a* and is torsionally rotatable by a motor 66. The extension member 56*b* extends from a side surface of the proximal end member 56*a*. The motor 66 is mounted on a surface of the proximal end member 56*a* which is opposite to the side surface from which the extension member 56*b* extends. The motor 66 is positioned coaxially to the extension member 56*b*.

As shown in FIG. 3, the first arm 50, the second arm 54, the joint member 52, and the auxiliary arm 58 are angularly movable or movable along a horizontal plane. The third arm 56 is torsionally rotatable by the motor 66.

In other words, in the arm assembly 20, the joint on the foremost end is horizontally angularly movable and torsionally movable, and the joints other than the joint on the foremost end are horizontally angularly movable. With this structure, since the central axes of the arms 50, 54, 56, the joint member 52, and the auxiliary arm 58 are not vertically displaced, the arm assembly 20 is held out of physical interference with another upper device 67 (see FIG. 3), for example, and hence a space can effectively be utilized by such an upper device 67.

Figure 5:
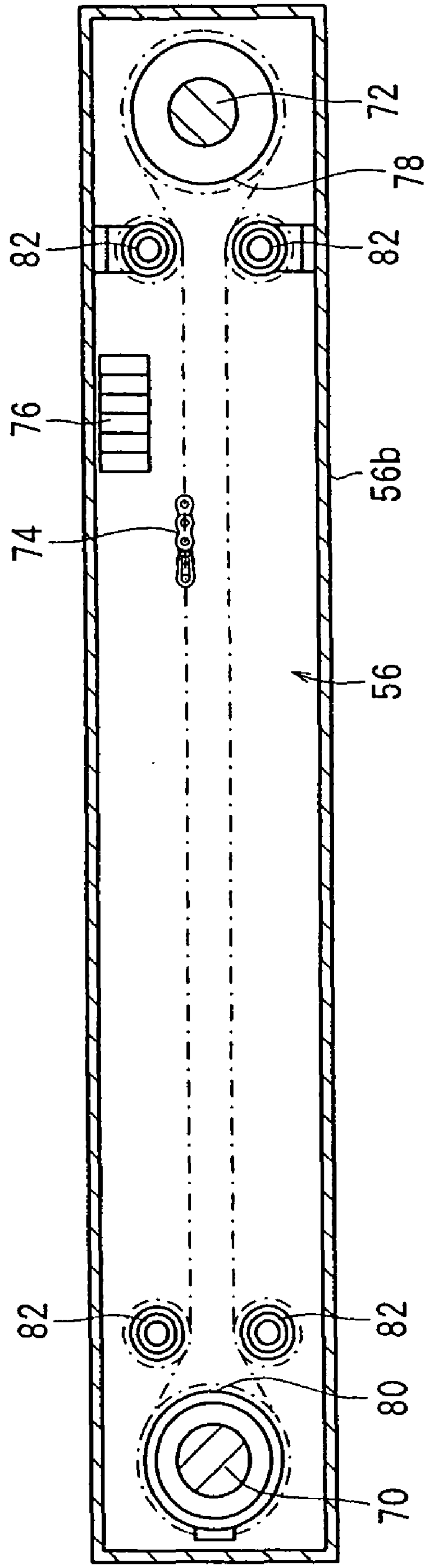
FIG. 5 is a sectional plan view of a third arm of the articulated robot.

As shown in FIGS. 4 and 5, the third arm 56 has a shaft 70 on its distal end to which the end effector 59 is angularly movably connected, a motor 72 for actuating the end effector 59, a chain (circulatory member) 74 extending longitudinally in the extension member 56*b* for transmitting rotation from the motor 72 to the shaft 70, and a pneumatic pressure device 76 housed in the extension member 56*b*. The motor 72 is mounted on the upper surface of the extension member 56*b* near the proximal end thereof. Since the end effector 59 is lightweight, the motor 72 may be small in size and is kept out of physical interference with the lower surface of the second arm 54.

The chain 74 is held in mesh with a drive sprocket 78 mounted on the rotatable shaft of the motor 72. The chain 74 is also held in mesh with a driven sprocket 80 mounted on a shaft 70 coupled to the end effector 59. Therefore, when the motor 72 is energized, the end effector 59 is turned about the shaft 70. The tension of the chain 74 is adjusted by a plurality of tensioners 82 held against the chain 74.

Use of the chain 74 to actuate the end effector 59 with the power from the motor 72 allows the motor 72 to be positioned on the proximal end of the third arm 56. Therefore, the inertial moment of the third arm 56 is reduced for stable movement thereof. The static moment of the third arm 56 is also decreased to reduce any flexure of the arms of the arm assembly 20.

The extension member 56*b* is of a thin box structure housing the chain 74 therein, and is lightweight and highly strong. The pneumatic pressure device 76 is disposed near the motor 72.

The end effector 59 comprises a plurality of pipes connected together into a grid pattern for attracting the workpiece W which may have a wide area, and a plurality of (eight, for example) vacuum cups 84 on the lower surfaces of the pipes. The vacuum cups 84 are individually controlled by the pneumatic pressure device 76. If the workpiece W is small in size, then only those vacuum cups 84 which are located in a central region of the end effector 59 are operated by the pneumatic pressure device 76 to attract the workpiece W. If the workpiece W is large in size, then all the vacuum cups 84 are operated by the pneumatic pressure device 76 to attract the workpiece W. The vacuum cups 84 are connected to a suction means such as a vacuum pump, an ejector, or the like through the pneumatic pressure device 76. The end effector 59 is replaceable with another end effector having a different shape depending on the shape of the workpiece W.

Figure 6:
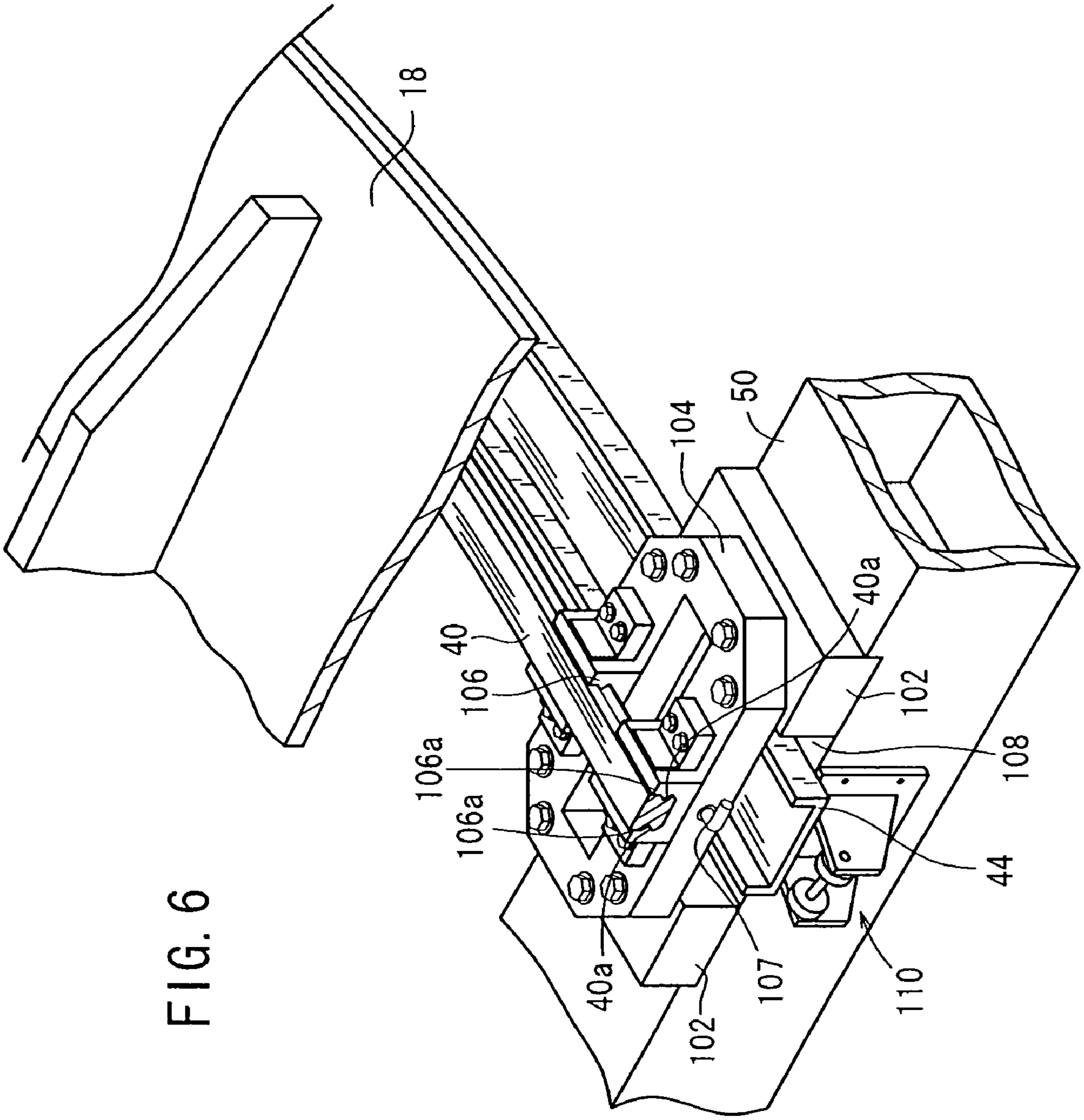
FIG. 6 is a fragmentary perspective view of an engaging assembly.

A structure by which the first arm 50 is supported on the support plate 18 will be described below with reference to FIG. 6.

The engaging assembly 100 which is supported on the support plate 18 by the arcuate rail 40 is mounted on an upper surface of the first arm 50. The engaging assembly 100 comprises two blocks 102 mounted on the upper surface of the first arm 50, a plate 104 fixed to respective upper surfaces of the blocks 102, and two guides 106 mounted on an upper surface of the plate 104. The plate 104 has a central hole for making itself lightweight. The guides 106 have respective retainers providing respective circulatory paths therein and a plurality of balls disposed in a series along each of the circulatory paths. The balls are held in rolling engagement with the arcuate rail 40. Therefore, the guides 106 can smoothly slide along the arcuate rail 40 as the balls roll along the circulatory paths of the retainers.

Grease nipples 107 are mounted on sides of the guides 106 to supply a grease to the balls and slide surfaces of the arcuate rail 40 to lubricate the balls and the slide surfaces and protect them against corrosion.

The guides 106 are disposed parallel to each other and engage the arcuate rail 40 for smoothly sliding movement therealong to allow the first arm 50 to be angularly moved smoothly. The arcuate rail 40 has a pair of grooves 40*a* defined in respective opposite side surfaces thereof, and the guides 106 have ridges 106*a* engaging in the grooves 40*a*. Since the ridges 106*a* engage in the grooves 40*a*, the first arm 50 and the engaging assembly 100 are suspended and supported by the support plate 18.

However, the first arm 50 may be supported on a lower member, rather than being suspended by the support plate 18.

A through gap 108 is defined horizontally between the blocks 102 and vertically between the first arm 50 and the plate 104. The oil pan 44 extends through the through gap 108. The oil pan 44 is supported on two roller units 110 mounted on respective opposite side surfaces of the first arm 50 below the oil pan 44. The roller units 110 are oriented in alignment with the direction in which the oil pan 44 moves with respect to the roller units 110. Though only one of the roller units 110 is illustrated in FIG. 6, the roller units 110 are of a symmetrical shape and thus, the other roller unit 110 is not illustrated.

A process in which the articulated robot 10 conveys the workpiece W from the machining unit 12 to the machining unit 14 will be described below.

It is assumed that the machining unit 12 is in a left position, the machining unit 14 in a right position, the machining units 12, 14 are spaced from each other by a distance which is substantially the same as the maximum conveyance distance of the articulated robot 10, and the center O of the support plate 18 is located intermediately between the machining units 12, 14.

Figure 7:
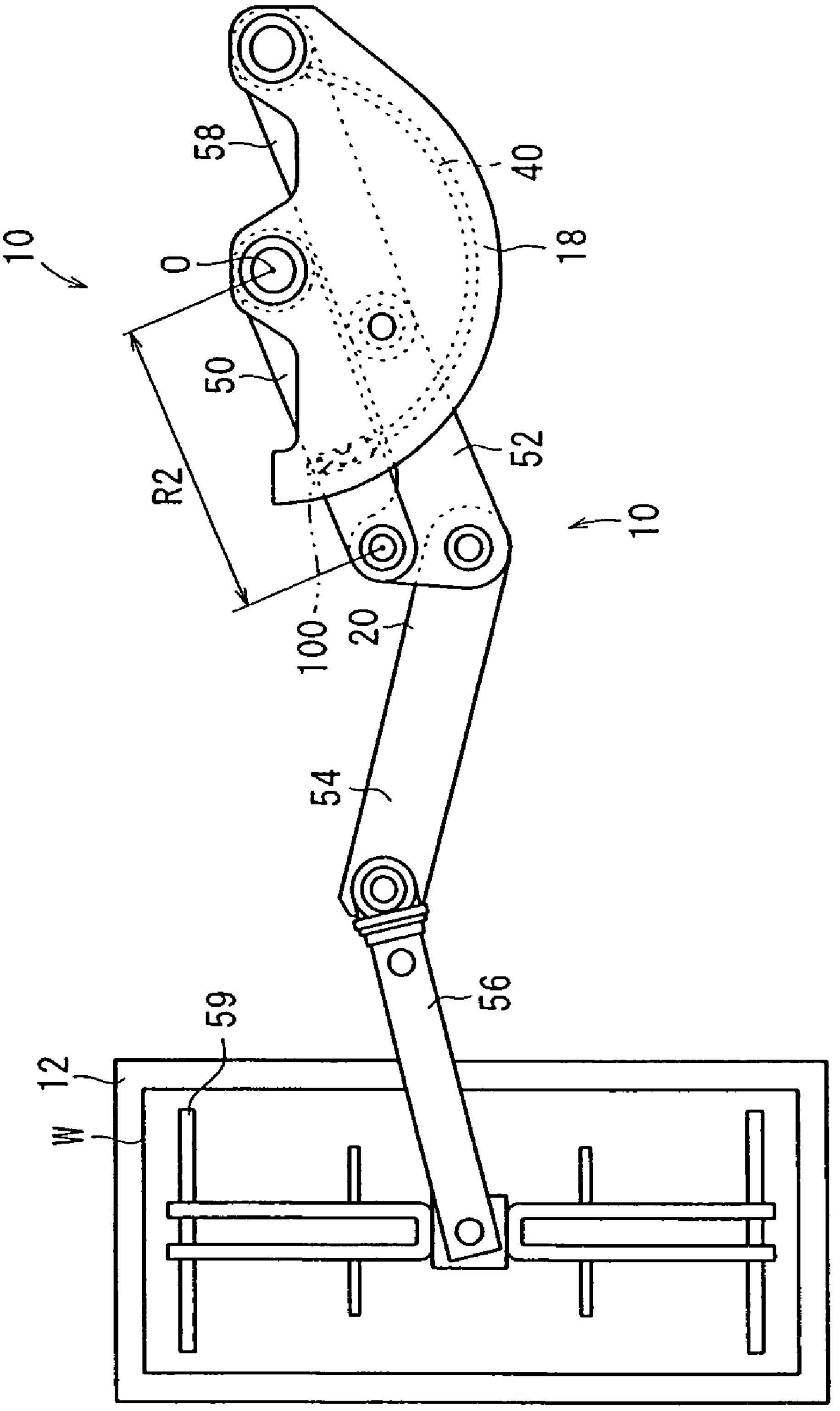
FIG. 7 is a plan view of the articulated robot with its end effector placed over a workpiece on a machining unit.

First, as shown in FIG. 7, the arm assembly 20 is moved to position the end effector 59 over the workpiece W on the machining unit 12. Specifically, the first arm 50 and the auxiliary arm 58 are angularly moved clockwise until the engaging assembly 100 reaches a position near the left end of the arcuate rail 40, and the second arm 54 and the third arm 56 are extended to the left. The end effector 59 is turned to match the shape and tilt of the workpiece W. Specifically, the third arm 56 is twisted by the motor 72 depending on the shape and tilt of the workpiece W. If necessary, the lifting and lowering devices 16*a*, 16*b* may be changed in height to tilt the support plate 18 and the arm assembly 20 as indicated by the arrow T (see FIG. 4).

Then, the lifting and lowering devices 16*a*, 16*b* are operated in synchronism with each other to lower the support plate 18 and the arm assembly 20 to bring the end effector 59 toward or into abutment against the upper surface of the workpiece W.

Then, the pneumatic pressure device 76 evacuates some or all of the vacuum cups 84 to attract the workpiece W under suction. Thereafter, the lifting and lowering devices 16*a*, 16*b* are operated in synchronism with each other again to elevate the support plate 18 and the arm assembly 20 to unload the workpiece W from the machining unit 12.

As shown in FIG. 8, while the articulated robot 10 is conveying the workpiece W from the machining unit 12 to the machining unit 14, the arms of the arm assembly 20 are operated in coordination, to cause the workpiece W to follow a path over substantially the minimum distance from the machining unit 12 to the machining unit 14. Specifically, the first arm 50 and the auxiliary arm 58 are angularly moved counterclockwise, and the second arm 54 and the third arm 56 are bent and retracted through appropriate angles.

In synchronism with the operation of the arm assembly 20, the end effector 59 is actuated to keep the workpiece W in a substantially constant attitude.

If both the second arm 54 and the third arm 56 are extended forwardly as indicated by the imaginary lines, then even when the workpiece W is kept in a substantially constant attitude, since the workpiece W moves along an arcuate path, the arm assembly 20 would produce an inertial moment and hence become unstable. Furthermore, since the workpiece W projects forwardly beyond a given conveyance limit line 150, the articulated robot 10 would need a wide space to convey the workpiece W. In addition, as the second arm 54, the third arm 56, and the workpiece W project considerably forwardly from the first arm 50, the auxiliary arm 58, and the support plate 18, the arm assembly 20 would produce a large inertial moment and a large static moment tending to cause the first arm 50, the auxiliary arm 58, and the support plate 18 to flex.

Even if the second arm 54 and the third arm 56 are projected forwardly as indicated by the imaginary lines, they can maintain the same attitude and path of workpiece W as when the second arm 54 and the third arm 56 are retracted, thereby holding the workpiece W within the conveyance limit line 150. However, since the second arm 54 and the third arm 56 project forwardly from the first arm 50 and the auxiliary arm 58, the arm assembly 20 would produce a certain inertial moment and a certain static moment tending to cause the first arm 50, the auxiliary arm 58, and the support plate 18 to flex.

According to the present invention, as indicated by the solid lines in FIG. 8, the arm assembly 20 is folded to move the workpiece W without projecting forwardly. Consequently, a space in front of the articulated robot 10 can effectively be utilized, and the first arm 50, the auxiliary arm 58, and the support plate 18 undergo a small inertial moment and a small static moment.

When the second arm 54 and the third arm 56 are folded and retracted rearwardly, the workpiece W can be conveyed along a straight path and is prevented from being turned along an arcuate path. Therefore, the workpiece W is less liable to produce an inertial moment. The second arm 54 and the third arm 56 are also prevented from being turned along an arcuate path and hence are less liable to produce an inertial moment.

As the workpiece W is conveyed while it is being held at a constant attitude, the workpiece W is prevented from being rotated about its own axis and hence is much less liable to produce an inertial moment. The workpiece W is thus conveyed stably.

Since the second arm 54 and the third arm 56 are folded and retracted rearwardly, a space in front of the articulated robot 10 can effectively be utilized. Inasmuch as the second arm 54 and the third arm 56 do not essentially project forwardly, any inertial and static moments on the first arm 50, the auxiliary arm 58, and the support plate 18 are small, and hence strain of the first arm 50, the auxiliary arm 58, and the support plate 18 is reduced.

While the workpiece W is being conveyed, the arm assembly 20, the end effector 59, and the workpiece W move only horizontally, and do not move vertically. Therefore, any space other than the space required for the arm assembly 20, the end effector 59, and the workpiece W to move therethrough is freely available and can effectively be utilized.

While the workpiece W is being conveyed, since the joint member 52, the first arm 50, and the auxiliary arm 58 jointly make up the parallel link mechanism, they are mechanically kept in a constant attitude and can easily be controlled.

Figure 9:
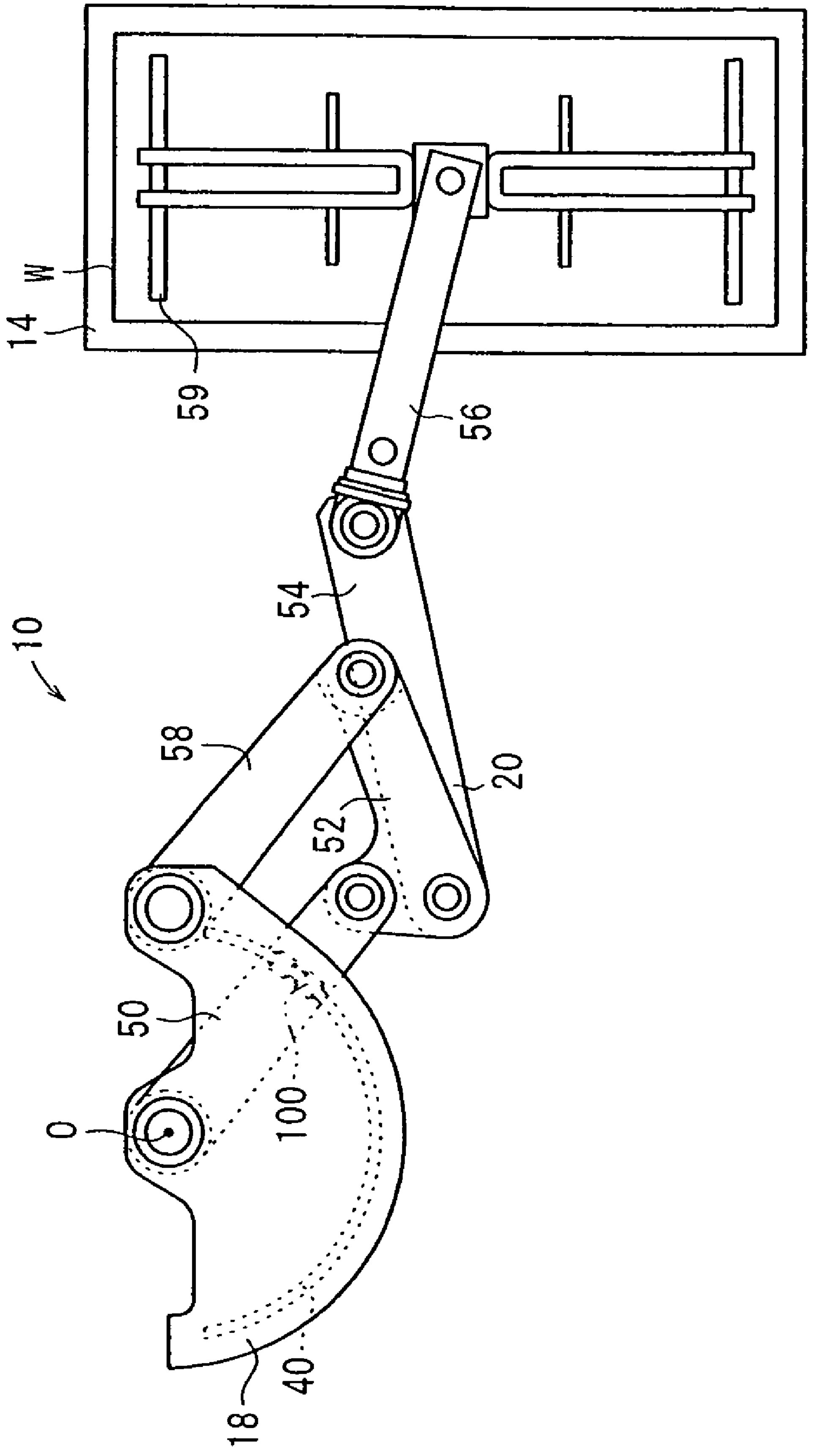
FIG. 9 is a plan view of the articulated robot which has placed the workpiece over the other machining unit.

As shown in FIG. 9, the arm assembly 20 is continuously operated to convey the workpiece W until the workpiece W is placed over the machining unit 14. Specifically, the first arm 50 and the auxiliary arm 58 are angularly moved counterclockwise until the engaging assembly 100 reaches a position near the right end of the arcuate rail 40, and the second arm 54 and the third arm 56 are extended to the right. The end effector 59 is turned to cause the orientation of the workpiece W to match the orientation of the machining unit 14. The third arm 56 is twisted by the motor 72 depending on the tilt of the mount surface of the machining unit 14. If necessary, the lifting and lowering devices 16*a*, 16*b* may be changed in height to tilt the support plate 18 and the arm assembly 20 as indicated by the arrow T (see FIG. 4).

Thereafter, the lifting and lowering devices 16*a*, 16*b* are operated in synchronism with each other to lower the support plate 18 and the arm assembly 20. Then, the vacuum cups 84 are inactivated to release the workpiece W onto the machining unit 14, thereby completing loading the workpiece W into the machining unit 14. Thereafter, the lifting and lowering devices 16*a*, 16*b* are operated to elevate the arm assembly 20 to a suitable height and move the arm assembly 20 into a predetermined standby attitude.

In the positions shown in FIGS. 7 and 8, the second arm 54 and the third arm 56 project considerably from the first arm 50, the auxiliary arm 58, and the support plate 18, and seem to produce large moments tending to cause themselves to flex. In the articulated robot 10, however, the structure by which the first arm 50 is supported by the support plate 18 and the parallel link mechanism including the auxiliary arm 58 and the joint member 52 are effective to prevent moments and flexure from being produced. The reasons why the structure by which the first arm 50 is supported by the support plate 18 and the parallel link mechanism are effective to prevent moments and flexure from being produced will be described below.

Figures 10A, 10B, 10C, 10D:
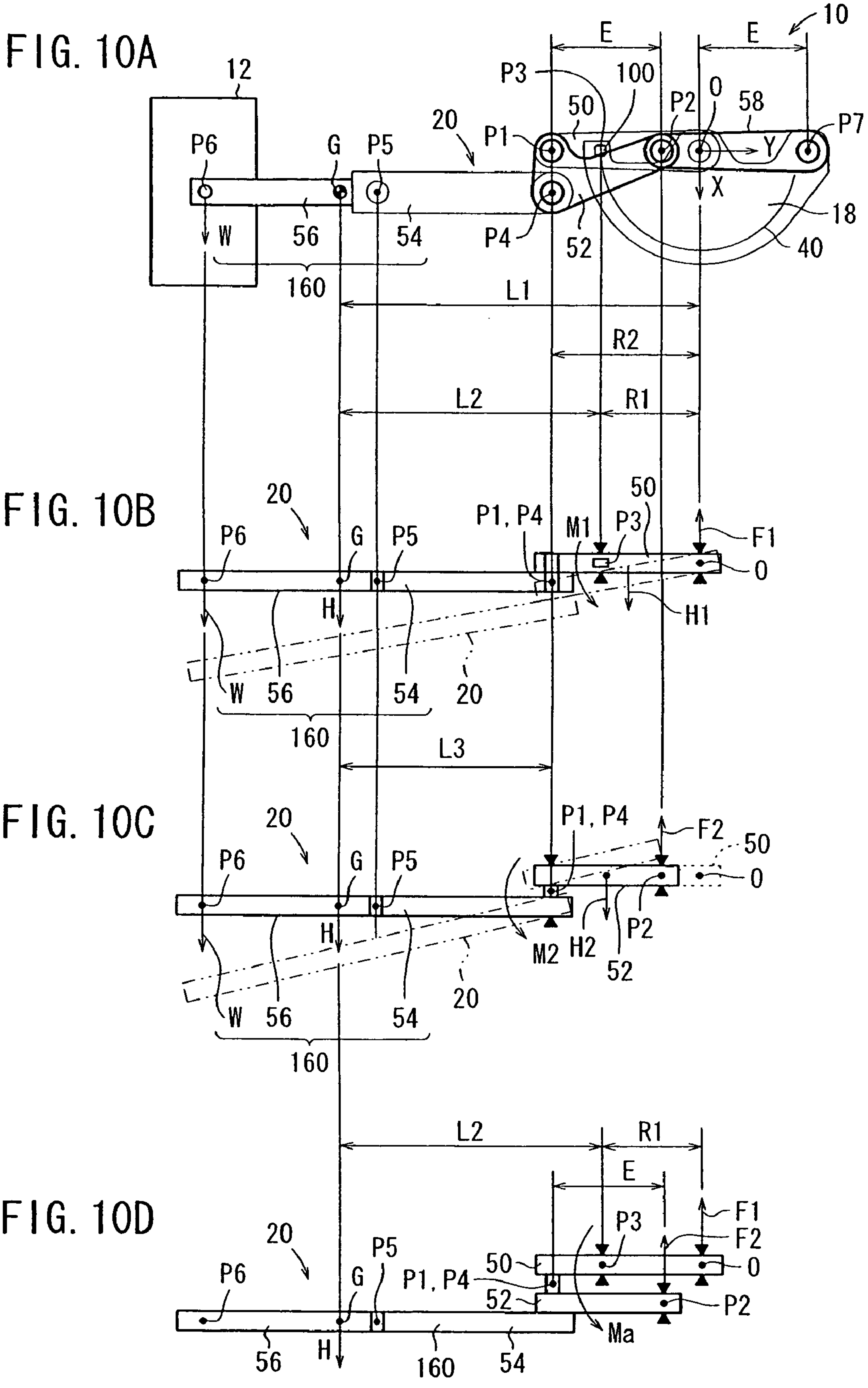
FIG. 10A is a schematic plan view of the articulated robot which is in a state for unloading the workpiece from the machining unit.
FIG. 10B is a schematic front elevational view of a distal end extension and a first arm which are in a state for unloading the workpiece from the machining unit.
FIG. 10C is a schematic front elevational view of the distal end extension and a joint member which are in a state for unloading the workpiece from the machining unit.
FIG. 10D is a schematic front elevational view of an arm assembly which is in a state for unloading the workpiece from the machining unit.

FIG. 10A schematically shows the manner in which the workpiece W is unloaded from the machining unit 12, for comparison with FIGS. 10B through 10D. In FIG. 10A, the first arm 50 extends exactly to the left. The first arm 50 and the auxiliary arm 58 are connected to the joint member 52 by respective joints P1, P2, and the engaging assembly 100 is at a position P3. The joint member 52 is connected to the second arm 54 by a joint P4, and the second arm 54 is connected to the third arm 56 by a joint P5. The shaft 70 of the third arm 56 is at a position P6, and the auxiliary arm 58 is angularly movable about a center P7. The second arm 54, the third arm 56, the end effector 59, and the workpiece W are collectively referred to as a distal end extension 160.

The distance between the joints P1, P2 which represents the horizontal width of the parallel link mechanism, or the distance between the center O and the center P7, is represented by E, the center of gravity of the arm assembly 20 by G, and the total mass of the arm assembly 20 by H. For the sake of brevity, the center G of gravity and the total mass H cover the workpiece W and the end effector 59.

FIG. 10B schematically shows the articulated robot 10 oriented to the left with the first arm 50 and the distal end extension 160 being modeled. As can be seen from FIG. 10B, since the arm assembly 20 has its proximal end located at the center O, a moment M1 acting on the arm assembly 20 is represented by the product L1×H of the distance L1 from the center O to the center G of gravity and the total mass H. The moment M1 is applied to the center O, tending to cause the arm assembly 20 to flex greatly as indicated by the imaginary lines. In the articulated robot 10, however, since the first arm 50 is supported on the support plate 18 by the engaging assembly 100 at the position P3, the moment M1 is actually indicated by the product L2×(H−H1) of the distance L2 (i.e., L1−R1) from the position P3 to the center G of gravity and the difference between the total mass H and the mass H1 of the first arm 50, and the moment M1 is applied to the position P3.

Therefore, the distance L2 from the fulcrum to the center G of gravity is smaller than the distance L1, which would be the distance from the fulcrum to the center G of gravity in the absence of the engaging assembly 100, by the radius R1, and the mass involved is indicated by H−H1. The moment M1 is thus reduced, and any strain on the arm assembly 20 is also reduced.

Since the first arm 50 is supported at the two positions, i.e., the center O and the position P3, which are spaced from each other, the joint P1 on the end of the first arm 50 is positionally more stable if the first arm 50 is of sufficiently high rigidity.

If the distal end extension 160 and the first arm 50 are considered to be a single beam, then the beam is supported at the two positions, i.e., the center O and the position P3, and is stabilized by a reactive force F1 generated at the center O to cancel out the moment M1. In the model shown in FIG. 10B, the reactive force F1 is determined as F1=M1/R1. Actually, since a reactive force F2 to be described later acts in cooperation with the reactive force F1, the reactive force F1 is of a value considerably smaller than M1/R1.

It can be understood from the above analysis that the radius R1 should be as close to the length R2 between the center O and the joint P1 as possible. Inasmuch as it is difficult to equalize the radius R1 and the length R2 under design conditions, however, the radius R1 should be one-half of the length R2 or greater or more preferably be three-fourths of the length R2 or greater to achieve the above advantages.

The advantages offered by the structure in which the first arm 50 is supported on the support plate 18 by the engaging assembly 100 are obtained not only when the distal end extension 160 extends to the left, but also when the distal end extension 160 extends forwardly as indicated by the imaginary lines in FIG. 8 while the workpiece W is being conveyed.

FIG. 10C schematically shows the articulated robot 10 oriented to the left with the joint member 52 and the distal end extension 160 being modeled. As can be seen from FIG. 10C, a moment M2 acting on the model is indicated by the product L3×(H−H2) of the distance L3 from the joint P1 (P4) to the center G of gravity and the difference between the total mass H and the mass H2 of the joint member 52, and the moment M2 is applied to the joint P1 (P4).

As described above, the joint P1 is positionally stable. If the arm assembly 20 were not supported by the joint P2, then the distal end extension 160 would need to be supported by only the joint P1 (and the joint P4). The moment M2 would be applied to cause the arm assembly 20 to flex greatly as indicated by the imaginary lines. In the articulated robot 10, however, if the joint member 52 and the distal end extension 160 are considered to be a single beam, then the beam is supported at two positions, i.e., by the joint P1 (and the joint P4) and the joint P2, and is stabilized by a reactive force F2 generated at the joint P2 to cancel out the moment M2. In the model shown in FIG. 10C, the reactive force F2 is determined as F2=M2/E. Actually, since the above reactive force F1 acts in cooperation with the reactive force F2, the reactive force F2 is of a value considerably smaller than M2/E.

For an easier understanding of the present invention, the arm assembly 20 has been described as the different models shown in FIGS. 10B and 10C. However, a combined model shown in FIG. 10D may be employed for the arm assembly 20. In the model shown in FIG. 10D, a combined moment Ma is applied to the position P3, and is canceled out by the reactive force F1 at the center O and the reactive force F2 at the joint P2, thereby stabilizing the arm assembly 20.

Figures 11A, 11B, 11C:
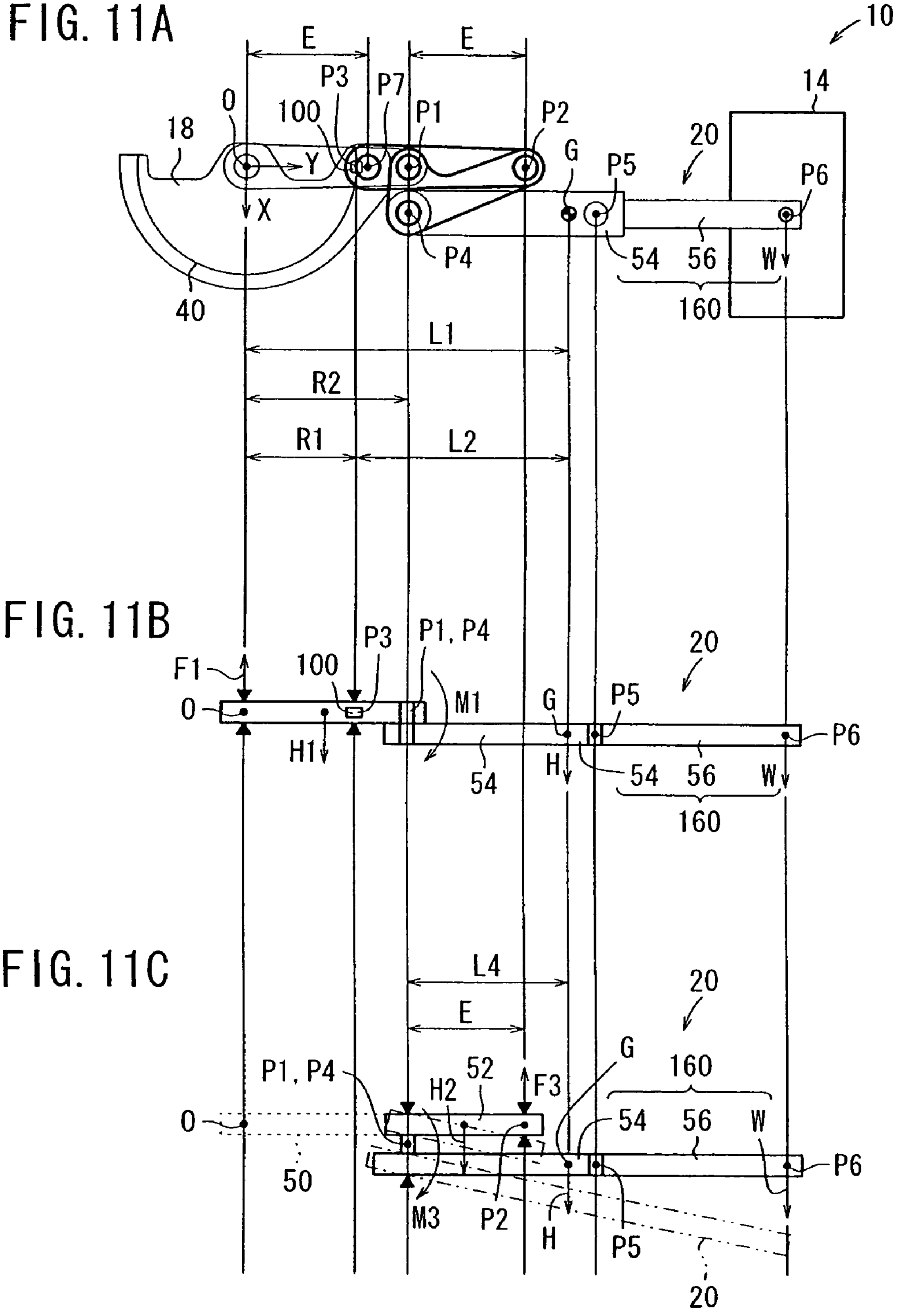
FIG. 11A is a schematic plan view of the articulated robot which is in a state for loading the workpiece into the other machining unit.
FIG. 11B is a schematic front elevational view of the distal end extension and the first arm which are in a state for loading the workpiece into the other machining unit.
FIG. 11C is a schematic front elevational view of the distal end extension and the joint member which are in a state for loading the workpiece into the other machining unit.

FIG. 11A schematically shows the manner in which the workpiece W is loaded into the machining unit 14, for comparison with FIGS. 11B and 11C. In FIG. 11A, the first arm 50 extends exactly to the right.

FIG. 11B schematically shows the articulated robot 10 oriented to the right with the first arm 50 and the distal end extension 160 being modeled. The first arm 50 and the distal end extension 160 shown in FIG. 11B are a horizontal reversal of those shown in FIG. 10B. It can easily be seen from FIG. 11B that the advantages offered by the structure in which the first arm 50 is supported on the support plate 18 by the engaging assembly 100 are also obtained from the model shown in FIG. 11B.

FIG. 11C schematically shows the articulated robot 10 oriented to the right with the joint member 52 and the distal end extension 160 being modeled. As can be seen from FIG. 11C, a moment M3 acting on the model is indicated by the product L4×(H−H2) of the distance L4 from the joint P1 (P4) to the center G of gravity and the difference between the total mass H and the mass H2 of the joint member 52, and the moment M3 is applied to the joint P1 (P4).

If the arm assembly 20 were not supported by the joint P2, then the distal end extension 160 would need to be supported by only the joint P1 (and the joint P4). The moment M3 would be applied to cause the arm assembly 20 to flex greatly as indicated by the imaginary lines. In the articulated robot 10, however, if the distal end extension 160 and the joint member 52 are considered to be a single beam, then the beam is supported at two positions, i.e., by the joint P1 (and the joint P4) and the joint P2, and is stabilized by a reactive force F3 generated at the joint P2 to cancel out the moment M3. In the model shown in FIG. 11C, the reactive force F3 is determined as F3=M3/E. Actually, since the above reactive force F1 acts in cooperation with the reactive force F3, the reactive force F3 is of a value considerably smaller than M3/E.

Figure 12:
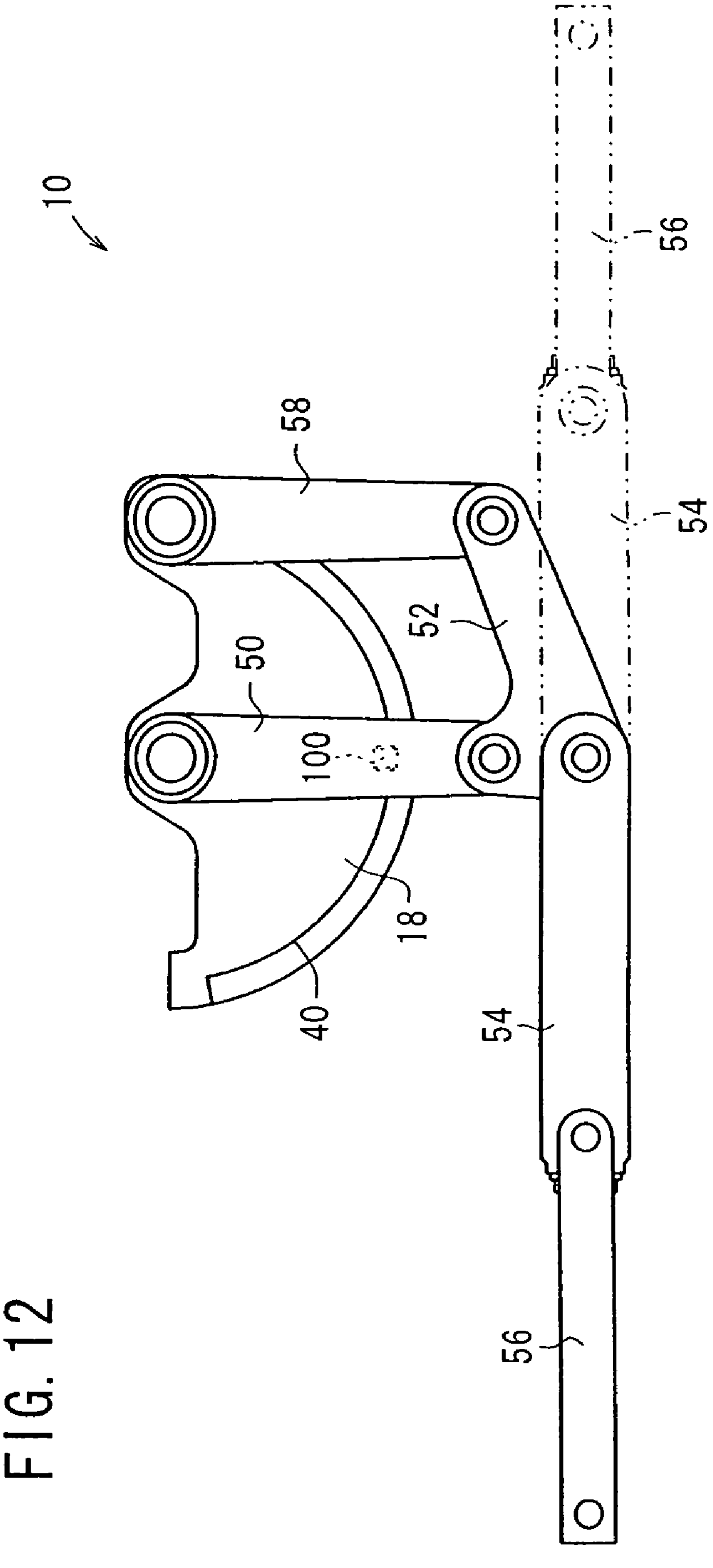
FIG. 12 is a plan view of the articulated robot in which the first arm and an auxiliary arm are oriented forwardly and the distal end extension extends leftwardly or rightwardly.

The advantages offered by supporting the joint member 52 with the joint P2 are seen particularly when the distal end extension 160 extends to the left or the right as shown in FIGS. 10C and 11C, allowing the workpiece W to be stably unloaded from the left machining unit 12 and stably loaded into the right machining unit 14. The advantages are achieved regardless of the angular positions of the first arm 50 and the auxiliary arm 58. For example, as shown in FIG. 12, the same advantages are offered when the distal end extension 160 extends to the left or the light even if the first arm 50 and the auxiliary arm 58 are oriented forwardly.

With the articulated robot 10 according to the present embodiment, as described above, the arcuate rail 40 supports the first arm 50 for horizontal angular movement, to make the arm assembly 20 less liable to flex due to its own weight and the weight of the workpiece W carried thereby. Even if the overall length of the arm assembly 20 is long, the articulated robot 10 can convey the workpiece W accurately over a long distance.

Since the arcuate rail 40 supports the first arm 50 which is closest to the proximal end of the arm assembly 20, any flexure of the arm assembly 20 is reliably reduced.

The first arm 50, the auxiliary arm 58 parallel to the first arm 50, and the joint member 52 connected to the distal ends of the first arm 50 and the auxiliary arm 58 jointly make up the parallel link mechanism. The parallel link mechanism is effective to support the distal end extension 160 when it extends in substantially the same direction as the joint member 52 (the Y direction), so that any rotation and flexure of the arm assembly 20 is further reduced.

Since the workpiece W can be conveyed between the machining unit 12 and the machining unit 14 by the single articulated robot 10, the entire articulated robot system can be constructed inexpensively and takes up a smaller installation space. The articulated robot 10 can convey the workpiece W quickly without the need for transferring the workpiece W to and from a carriage. As the workpiece W does not need to be transferred to and from a carriage, the articulated robot 10 is not required to operate in synchronism with the carriage, and hence can be controlled by a simple control process. The distance by which and the position to which the workpiece W is to be conveyed can flexibly be changed by changing the attitude of the arm assembly 20 based on a program. The articulated robot 10 is applicable in the case where the layout of the machining units 12, 14 is changed.

While the workpiece W is being conveyed, the arm assembly 20 basically moves along a horizontal plane and does not move vertically in a so-called elbow-up attitude. Accordingly, the articulated robot 10 needs only a small space in which the arm assembly 20 moves.

Since the articulated robot 10 has the lifting and lowering devices 16*a*, 16*b* for lifting and lowering the support plate 18 and the arm assembly 20 as a whole, the articulated robot 10 can easily transfer the workpiece W to and from the machining units 12, 14 and can easily move the workpiece W while avoiding obstacles. As the arm assembly 20 does not move vertically in a so-called elbow-up attitude, the space around the arm assembly 20 can effectively be utilized.

The second arm 54 is connected to the joint member 52 on the line Lp perpendicular to the line interconnecting the pivot shafts on the distal ends of the first arm 50 and the auxiliary arm 58. Any flexure of the second arm 54 under its own weight and the overall weight of the workpiece W is reduced due to the width E of the parallel link mechanism.

Although a certain preferred embodiment of the present invention has been shown and described in detail, it should be understood that various changes and modifications may be made therein without departing from the scope of the appended claims.

What is claimed is:

1. An articulated robot comprising:

a plurality of arms pivotally connected together by angularly movable joints;

said arms including a horizontal arm angularly movable horizontally about a point thereof, an auxiliary arm, and a second arm;

a joint member to which ends of the horizontal, auxiliary, and second arms are pivotally connected; and a support member having an arcuate shape coaxial with said point of said horizontal arm, said support member being pivotally connected to said horizontal arm, and a portion of said horizontal arm being slidably supported on said support member.

2. An articulated robot according to claim 1, wherein said support member comprises a rail engaging the portion of said horizontal arm.

3. An articulated robot according to claim 1, wherein said portion of said horizontal arm is supported by said support member at a position between a distal end thereof and a center thereof.

4. An articulated robot according to claim 1, further comprising:

a lifting and lowering device operatively connected to said support member for vertically moving said support member.

5. An articulated robot according to claim 4, wherein said lifting and lowering device has weight compensating means for compensating weights of said arms, said joint member, and said support member.

6. An articulated robot according to claim 1, wherein said arms further include a foremost arm disposed at a distal end of the articulated robot when said arms are extended, said second arm is disposed between said horizontal and foremost arms, said foremost arm is horizontally angularly movable and/or torsionally movable, and the arms other than said foremost arm are horizontally angularly movable.

7. An articulated robot according to claim 1, wherein said arms further include a foremost arm disposed at a distal end of the articulated robot when said arms are extended, said second arm is disposed between said horizontal and foremost arms, and wherein said foremost arm includes a circulatory member extending longitudinally therein for angularly moving an end effector mounted on a distal end of said foremost arm.

8. An articulated robot according to claim 1, wherein said auxiliary arm extends parallel to said horizontal arm; and said horizontal arm, said auxiliary arm, and said joint member jointly make up a parallel link mechanism with the support member.

9. An articulated robot according to claim 8, further comprising:

rotary drive sources mounted respectively on said horizontal arm and said auxiliary arm for angularly moving said parallel link mechanism.

10. An articulated robot according to claim 8, wherein said joint member is connected to the respective distal ends of said horizontal arm, said second arm, and said auxiliary arm by respective pivot shafts thereof, said second arm is connected to a portion of said joint member spaced from said pivot shaft of said horizontal arm and said pivot shaft of said auxiliary arm.

11. An articulated robot comprising:

a plurality of arms pivotally connected together by angularly movable joints;

said arms including a horizontal arm angularly movable horizontally about a point thereof and an auxiliary arm;

a joint member to which said horizontal and auxiliary arms are pivotally connected; and a support member having an arcuate shape coaxial with said point of said horizontal arm, said support member being pivotally connected to said horizontal arm, and a portion of said horizontal arm being slidably supported on said support member;

wherein said support member forms a parallel link mechanism with said horizontal and auxiliary arms and said joint member.

12. An articulated robot according to claim 11, wherein said support member comprises a rail engaging the portion of said horizontal arm.

13. An articulated robot according to claim 11, wherein said portion of said horizontal arm is supported by said support member at a position between a distal end thereof and a center thereof.

14. An articulated robot according to claim 11, further comprising:

a lifting and lowering device operatively connected to said support member for vertically moving said support member.

15. An articulated robot according to claim 14, wherein said lifting and lowering device has weight compensating means for compensating weights of said arms, said joint member, and said support member.

16. An articulated robot according to claim 11, wherein said arms further include a foremost arm disposed at a distal end of the articulated robot when said arms are extended, said foremost arm is horizontally angularly movable and/or torsionally movable, and the arms other than said foremost arm are horizontally angularly movable.

17. An articulated robot according to claim 11, wherein said arms further include a foremost arm disposed at a distal end of the articulated robot when said arms are extended, and wherein said foremost arm includes a circulatory member extending longitudinally therein for angularly moving an end effector mounted on a distal end of said foremost arm.

18. An articulated robot according to claim 11, wherein said auxiliary arm extends parallel to said horizontal arm.

19. An articulated robot according to claim 11, further comprising:

rotary drive sources mounted respectively on said horizontal arm and said auxiliary arm for angularly moving said parallel link mechanism.

20. An articulated robot according to claim 18, wherein said joint member is connected to the respective distal ends of said horizontal arm and said auxiliary arm by respective pivot shafts thereof, said arms further include:

a second arm connected to a portion of said joint member spaced from said pivot shafts.

* * * * *